(12) United States Patent
Sanderson et al.

(10) Patent No.: US 12,212,455 B2
(45) Date of Patent: *Jan. 28, 2025

(54) NETWORK CONTROL

(71) Applicant: Comcast Cable Communications, LLC, Philadelphia, PA (US)

(72) Inventors: Phillip A. Sanderson, Mt. Laurel, NJ (US); Thomas William Lynn, Jr., Berryville, VA (US); Joseph Attanasio, Philadelphia, PA (US); Yash Lachmandas Khemani, Falls Church, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/193,395

(22) Filed: Mar. 30, 2023

(65) Prior Publication Data
US 2023/0239203 A1 Jul. 27, 2023

Related U.S. Application Data

(63) Continuation of application No. 17/199,134, filed on Mar. 11, 2021, now Pat. No. 11,646,934, which is a
(Continued)

(51) Int. Cl.
*H04L 41/0806* (2022.01)
*H04L 43/08* (2022.01)
(Continued)

(52) U.S. Cl.
CPC .......... *H04L 41/0806* (2013.01); *H04L 43/08* (2013.01); *H04W 24/02* (2013.01);
(Continued)

(58) Field of Classification Search
CPC ... H04L 41/0806; H04L 43/08; H04L 43/026; H04W 24/00; H04W 24/02; H04W 48/00;
(Continued)

(56) References Cited

U.S. PATENT DOCUMENTS 8,284,817 B2 10/2012 Husted et al.
9,026,099 B2 5/2015 Chhabra et al.
(Continued)

FOREIGN PATENT DOCUMENTS

EP 2421331 A1 2/2012
EP 2672758 A1 12/2013
(Continued)

OTHER PUBLICATIONS

Extended European Search Report issued in related application No. EP15192104.6 mailed Mar. 14, 2016.

*Primary Examiner* — Mohamed A Kamara
(74) *Attorney, Agent, or Firm* — Ballard Spahr LLP

(57) ABSTRACT

Systems and methods for managing a network are disclosed. For example, systems and methods are disclosed for selectively disabling and/or otherwise configuring devices to avoid interference, overlapping service, and/or the like. Signal information for nearby devices can be detected and analyzed to determine device configuration settings.

20 Claims, 11 Drawing Sheets

Related U.S. Application Data continuation of application No. 15/429,883, filed on Feb. 10, 2017, now Pat. No. 10,985,976, which is a continuation of application No. 14/526,997, filed on Oct. 29, 2014, now Pat. No. 9,608,864.

(51) Int. Cl.
  *H04W 24/02* (2009.01)
  *H04W 48/12* (2009.01)
  *H04W 84/12* (2009.01)
  *H04W 88/06* (2009.01)

(52) U.S. Cl.
  CPC ............ *H04W 48/12* (2013.01); *H04W 84/12* (2013.01); *H04W 88/06* (2013.01)

(58) Field of Classification Search
  CPC ..... H04W 48/12; H04W 84/00; H04W 84/12; H04W 88/06
  See application file for complete search history.

(56) References Cited

U.S. PATENT DOCUMENTS

| | | |
|---|---|---|
| 9,608,864 B2 | 3/2017 | Sanderson et al. |
| 9,813,873 B2 | 11/2017 | Ben-Itzhak |
| 9,900,919 B1 | 2/2018 | Butler et al. |
| 10,985,976 B2 | 4/2021 | Sanderson |
| 2002/0022483 A1 | 2/2002 | Thompson et al. |
| 2006/0094370 A1 | 5/2006 | Nguyen |
| 2010/0100930 A1 | 4/2010 | King |
| 2010/0172274 A1 | 7/2010 | Wu et al. |
| 2010/0182959 A1 | 7/2010 | Cook et al. |
| 2013/0064079 A1* | 3/2013 | Zhang ................... H04L 43/026 370/230 |
| 2013/0102313 A1 | 4/2013 | Tinnakornsrisuphap et al. |
| 2013/0150012 A1 | 6/2013 | Chhabra |
| 2013/0259005 A1 | 10/2013 | Kuikami |
| 2014/0045536 A1 | 2/2014 | Sydir et al. |
| 2014/0323087 A1 | 10/2014 | Huang et al. |
| 2015/0082427 A1* | 3/2015 | Ivanchykhin ...... G06Q 20/4015 726/22 |
| 2015/0085745 A1* | 3/2015 | Atreya ................... H04W 16/18 370/328 |
| 2015/0141027 A1 | 5/2015 | Tsui |
| 2015/0289276 A1 | 10/2015 | Goussard |
| 2016/0037458 A1 | 2/2016 | Ponuswamy et al. |
| 2016/0037459 A1 | 2/2016 | Swartz et al. |
| 2016/0234792 A1 | 8/2016 | Zhuang et al. |

FOREIGN PATENT DOCUMENTS

| | | |
|---|---|---|
| WO | 2006072860 A1 | 7/2006 |
| WO | 2013152305 A1 | 10/2013 |
| WO | 2013184433 A1 | 12/2013 |

* cited by examiner

NETWORK CONTROL

CROSS-REFERENCE TO RELATED APPLICATIONS

This application is a continuation of U.S. Non-Provisional Application Ser. No. 17/199,134, filed on Mar. 11, 2021, which is a continuation of U.S. Non-Provisional application Ser. No. 15/429,883, filed on Feb. 10, 2017, and issued as U.S. Pat. No. 10,985,976 on Apr. 20, 2021, which is a continuation of U.S. Non-Provisional application Ser. No. 14/526,997, filed on Oct. 29, 2014, and issued as U.S. Pat. No. 9,608,864 on Mar. 28, 2017, each of which are incorporated by reference in their entireties herein.

BACKGROUND

A network such as a local area network can comprise one or more network devices such as access points (AP) to provide a means for one or more user devices to communicate with and/or over the network. A network device can comprise a device that allows wired and/or wireless user devices to connect to a network using Wi-Fi, Bluetooth, or other standards. A network device can be configured to provide access to one or more services (e.g., access to a private network or a public network, access to network-related services). In certain locations, where many network devices may be present, network devices may encounter or even provide interfering wireless signals. These and other shortcomings are addressed by the present disclosure.

SUMMARY

It is to be understood that both the following general description and the following detailed description are exemplary and explanatory only and are not restrictive. Methods and systems for providing services (e.g., network connectivity, broadband services, etc.) to one or more user devices or clients, are disclosed. In an aspect, the present methods and systems allow for configuring a network to avoid or remove certain conflicting and/or redundant wireless services provided by multiple devices. For example, a service provider may provide (e.g., to users) devices that broadcast the same or similar wireless networks, for example, with the same or associated service set identifiers (SSID). In this situation, and others, it may be desired to selectively enable or disable, determine network settings, and/or otherwise configure the devices to avoid interference, overlapping service, and/or the like. For example, the methods and systems described herein, in one aspect, can selectively disable the provision of one or more services. As another example, radio frequency (RF) scanning can be used to selectively determine channel selection for transmitting one or more services via RF.

In an aspect, an example method can comprise providing a first via a plurality of first devices. At least a portion of the plurality of first devices can be configured to provide access to respective second networks. A second local network can be provided from a second device upon initialization of the second device, and signal information relating to the plurality of first devices can be determined at the second device. A coverage gap of the wide area network can be identified based on the signal information. An access mechanism to facilitate access to the wide area network via the second network device can be provided based on the identification of the coverage gap.

In another aspect, an example method can comprise receiving signal information related to at least one of a plurality of devices configured to provide access to a wide area network and respective local networks. Coverage of the wide area network within range of a first device of the plurality of devices can be determined, a network signal for the wide area network provided by the first device can be disabled. The network signal can be configured to provide access to the wide area network when enabled.

In another aspect, an example method can comprise receiving signal information related to at least one of a plurality of devices configured to provide access to a wide area network and respective local networks. Coverage of the wide area network within range of a first device of the plurality of devices can be determined, and a network signal for the wide area network can be enabled. The network signal can be configured to provide access to the wide area network from the first device.

In another aspect, methods can comprise determining signal information. A determination can be made whether to provide access to a network via a network device. The determination can be based on the signal information. Access to the network can be facilitated via the network device based on the determination of whether to provide access to the first network.

In another aspect, methods can comprise receiving signal information relating to at least one network device that is providing access to a first network from at least one respective first location. A determination can be made, based on the signal information, whether to provide access to the first network at a second location. Access can be provided at the second location to at least one of the first network and a second network based upon the determination of whether to provide access to the first network.

In a further aspect, methods can comprise providing, from a first device, a network signal for a first network. Signal information relating to at least one second device providing access to the first network can be received. The network signal for the first network provided from the first device can be disabled based on the signal information.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
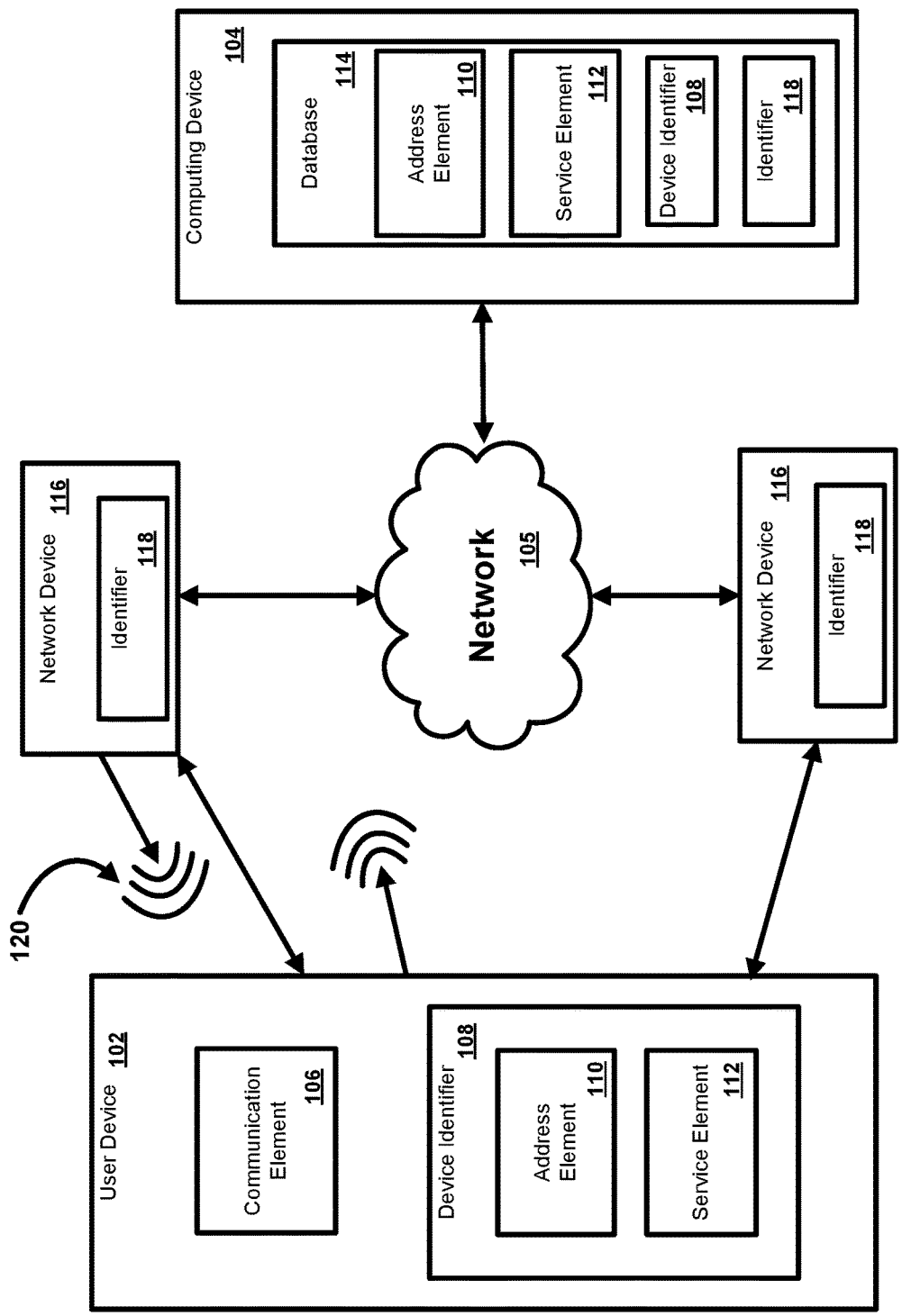
FIG. 1 is a block diagram of an exemplary system and network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded on a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The methods and systems described herein, in one aspect, can provide services (e.g., network connectivity, broadband services, etc.) to one or more user devices or clients. In another aspect, the methods and systems described herein can use a radio frequency (RF) scan or other interference detection to determine whether or not a particular SSID should be transmitted. As an example, the RF scan can be used to determine a number of service set identifiers (SSID) that are being transmitted on one or more RF channels. As another example, the RF scan can be used to determine a noise floor, a number of SSIDs with the same or associated name, one or more SSIDs or devices with a signal strength (e.g., quality, intensity) received above a configurable threshold, and/or channel activity and/or channel utilization that are within configurable thresholds. The RF scan can also determine a received signal strength indicator (RSSI) associated with one or more of the SSIDs. A determination can be made to select one of a plurality of RF channels to transmit one or more SSIDs. As an example, an AP can be configured (e.g., automatically self-configured) to transmit or suppress transmission of an SSID on the select RF channel.

In one aspect of the disclosure, a system can be configured to provide services such as network-related services. FIG. 1 illustrates various aspects of an exemplary environment in which the present methods and systems can operate. The present disclosure is relevant to systems and methods for providing services to a user device or a device that serves a user device, for example. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a user device 102 in communication with a computing device 104, such as a server, for example. The computing device 104 can be disposed locally or remotely relative to the user device 102. As an example, the user device 102 and the computing device 104 can be in communication via a network 105. The network 105 can comprise one or more networks, such as a first network and a plurality of second network. The first network can comprise a wide area network (e.g., a content network, service network, provider network, the Internet), public network, open network, provider managed network, non-user managed network, provider controlled network, non-user controlled network, and/or the like. An example second network can comprise a local network, private network, closed network, user managed network, user controlled network, user deployed network, and/or the like. Other forms of communications can be used, such as wired and wireless telecommunication channels, for example.

In an aspect, the user device 102 can be an electronic device, such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting information to the user and receiving a user feedback, such as a application client or a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device, such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device, such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can be an internet protocol address, a MAC address, a network address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network and/or location.

In an aspect, the service element 112 can comprise an identification of a service provider associated with the user device 102 and/or with the class of user device 102. As an example, the service element 112 can comprise information relating to or provided by a communication service provider (e.g., Internet service provider) that is providing or enabling communication services to the user device 102. As a further example, the service element 112 can comprise information relating to a preferred service provider for one or more particular services relating to the user device 102. In an aspect, the address element 110 can be used to identify or retrieve the service element 112, or vice versa. As a further example, one or more of the address element 110 and the service element 112 can be stored remotely from the user device 102 and retrieved by one or more devices, such as the user device 102 and the computing device 104. Other information can be represented by the service element 112.

In an aspect, the computing device 104 can be a server for communicating with the user device 102. As an example, the computing device 104 can communicate with the user device 102 for providing services. In an aspect, the computing device 104 can allow the user device 102 to interact with remote resources, such as data, devices, and files. As an example, the computing device can be configured as central location (e.g., a headend, or processing facility), which can receive content (e.g., data, input programming) from multiple sources. The computing device 104 can combine the content from the various sources and can distribute the content to user (e.g., subscriber) locations via a distribution system.

In an aspect, the computing device 104 can manage the communication between the user device 102 and a database 114 for sending and receiving data therebetween. As an example, the database 114 can store a plurality of data sets (e.g., mapped identifiers, relational tables, user device identifiers (e.g., identifier 108) or records, network device identifiers (e.g., identifier 118), or other information). As a further example, the user device 102 can request and/or retrieve a file from the database 114. In an aspect, the database 114 can store information relating to the user device 102, such as the address element 110 and/or the service element 112. As an example, the computing device 104 can obtain the device identifier 108 from the user device 102 and retrieve information from the database 114, such as the address element 110 and/or the service elements 112. As another example, the computing device 104 can obtain the address element 110 from the user device 102 and can retrieve the service element 112 from the database 114, or vice versa. As a further example, the computing device 104 can obtain a MAC address from the user device 102 and can retrieve a local IP address from the database 114. As such, the local IP address can be provisioned to the user device 102, for example, as the address element 110 to facilitate interaction between the user device 102 and a network (e.g., LAN). Any information can be stored in and retrieved from the database 114. The database 114 can be disposed remotely from the computing device 104 and accessed via direct or indirect connection. The database 114 can be integrated with the computing system 104 or some other device or system.

In an aspect, one or more network devices 116 can be in communication with a network, such as network 105. As an example, one or more of the network devices 116 can facilitate the connection of a device, such as user device 102, to the network 105. As a further example, one or more of the network devices 116 can be configured as a network gateway. In an aspect, one or more network devices 116 can be configured to allow one or more wireless devices to connect to a wired and/or wireless network using Wi-Fi, Bluetooth or similar standard.

In an aspect, the network devices 116 can be configured as a mesh network. As an example, one or more network devices 116 can comprise a dual band wireless network device. As an example, the network devices 116 can be configured with a first service set identifier (SSID) (e.g., associated with a user network or private network) to function as a local network for a particular user or users. As a further example, the network devices 116 can be configured with a second service set identifier (SSID) (e.g., associated with a public/community network or a hidden network) to function as a secondary network or redundant network for connected communication devices.

In an aspect, one or more network devices 116 can comprise an identifier 118. As an example, one or more identifiers can be a media access control address (MAC address). As a further example, one or more identifiers 118 can be a unique identifier for facilitating communications on the physical network segment. In an aspect, each of the network devices 116 can comprise a distinct identifier 118. As an example, the identifiers 118 can be associated with a physical location of the network devices 116.

In an aspect, the user device 102 can connect to a first network, such as a LAN associated with a first SSID, via a network device (e.g., network device 116, gateway device, computing device 104, server, router, etc.) As an example, the user device 102 can discover a beacon 120 transmitted (e.g., wirelessly) by the network device 116. The beacon 120 can comprise a beacon frame. The beacon 120 can comprise information to facilitate a connection between the user device 102 and the network device 116.

In an aspect, the beacon 120 and/or an SSID can be transmitted over one or more channels or frequency bands. The user device 102 can be configured to support 2.4 GHZ and 5 GHZ bands for WiFi. Within the 2.4 Ghz band, multiple channels (e.g., channels 1-11 (in the United States) and 1-14 (outside the United States) can be used. The 2.4 GHz band can comprise 2412 Mhz-2484 Mhz. The 5 Ghz band can comprise one or more channels governed by many possible regulations between channel 7 and 196, for example, between 4915 Mhz and 5825 Mhz. Any number of channels where regulations allow can be used to broadcast a beacon (e.g., beacon 120) and transmit data.

In another aspect, the methods and systems described herein can use an RF scan to determine a number of service set identifiers (SSID) that are being transmitted on one or more RF channels. An RF scan can be implemented via a receiver of an access point (or other configured device), whereby the receiver can analyze one or more signals currently present on a given channel(s) for which the scan is occurring. The access point can demodulate any signals which can be demodulated, and interpret the content of the demodulated signal. The access point can determine saturation of the given channel. Saturation can comprise the availability of transmit time slots on the given channel. The access point can determine the level of noise on the channel (e.g., for a signal that cannot be demodulated). The access point can determine a list of other devices which are transmitting on the given channel, as well as the noise floor. Such a list of devices can include other access points, WiFi clients, or transmitting devices. The RF scan can be performed on one or multiple channels. As an example, the RF scan can determine the number of APs that are sending a beacon for a particular SSID. As another example, the RF scan can be used to determine a noise floor, a number of SSIDs with the same or similar name, one or more SSIDs or devices with a strong signal (received above a configurable threshold), channel activity and/or channel utilization. The RF scan can also determine a received signal strength indicator (RSSI) associated with one or more of the SSIDs. A determination can be made to select one of a plurality of RF channels to transmit or suppress one or more SSIDs. As an example, an AP can be configured (e.g., automatically self-configured) to transmit or suppress an SSID on the select RF channel.

Figure 2:
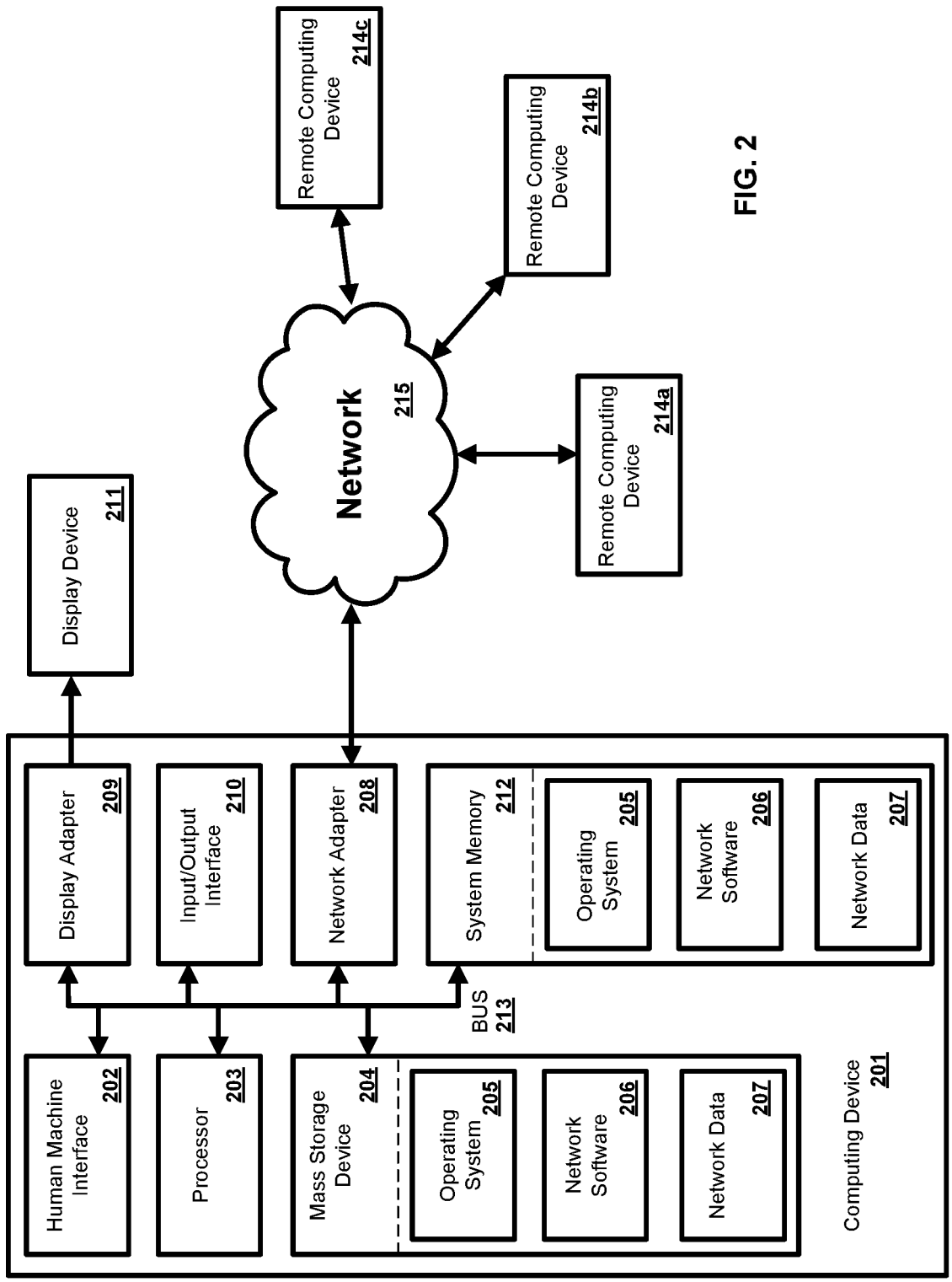
FIG. 2 is a block diagram of an exemplary computing device.

In an exemplary aspect, the methods and systems can be implemented on a computing system, such as computing device 201 as illustrated in FIG. 2 and described below. By way of example, one or more of the user device 102 and the computing device 104 of FIG. 1 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, network software 206, network data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computing device 201 typically comprises a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data, such as network data 207, and/or program modules, such as operating system 205 and network software 206, that are immediately accessible to and/or are presently operated on by the processing unit 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), solid state drives, and the like.

Optionally, any number of program modules can be stored on the mass storage device 204, including by way of example, an operating system 205 and network software 206. Each of the operating system 205 and network software 206 (or some combination thereof) can comprise elements of the programming and the network software 206. Network data 207 can also be stored on the mass storage device 204. Network data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computer 201 can have more than one display device 211. For example, a display device can be a monitor, an LCD (Liquid Crystal Display), or a projector. In addition to the display device 211, other output peripheral devices can comprise components, such as speakers (not shown) and a printer (not shown) which can be connected to the computing device 201 via Input/Output Interface 210. Any step and/or result of the methods can be output in any form to an output device. Such output can be any form of visual representation, including, but not limited to, textual, graphical, animation, audio, tactile, and the like. The display 211 and computing device 201 can be part of one device, or separate devices.

The computing device 201 can operate in a networked environment using logical connections to one or more remote computing devices 214a,b,c. By way of example, a remote computing device can be a personal computer, portable computer, a smart phone, a server, a router, a network computer, a peer device or other common network node, and so on. Logical connections between the computing device 201 and a remote computing device 214a,b,c can be made via a network 215, such as a local area network (LAN) and a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 205, are illustrated herein as discrete blocks, although it is recognized that such programs and components reside at various times in different storage components of the computing device 201, and are executed by the data processor(s) of the computer. An implementation of network software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 3:
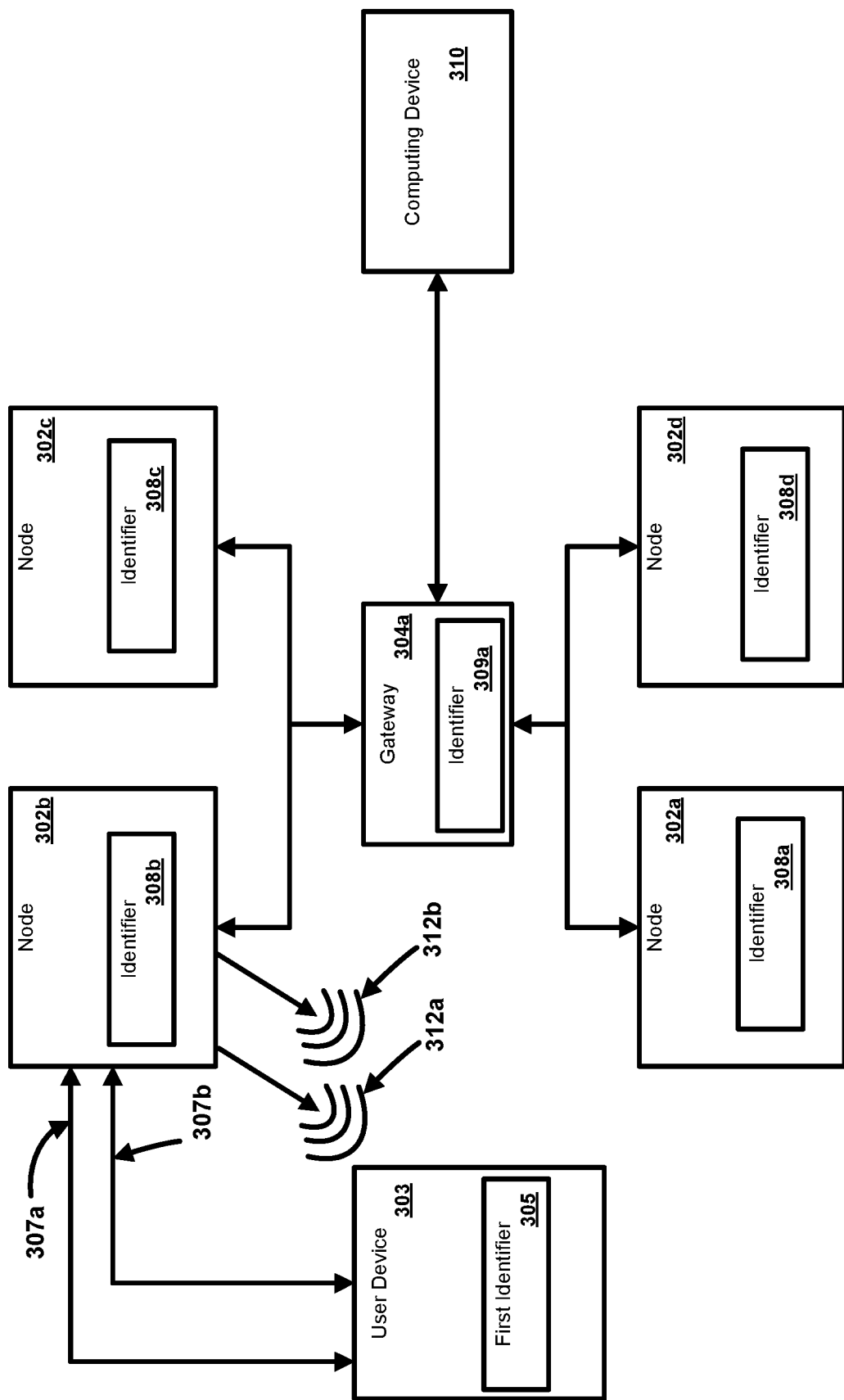
FIG. 3 is a block diagram of an exemplary system and network.

FIG. 3 illustrates an exemplary system and network. In an aspect, a plurality of nodes 302a, 302b, 302c, 302d can be in communication with one or more user devices 303 and a gateway 304a. As an example, one or more nodes 302a, 302b, 302c, 302d can be a network device, router, switch, communication device, or the like. As another example, one or more user devices 303 can be an electronic device, such as a computer, a smartphone, a laptop, a tablet, a set top box, a display device, or other device capable of communicating with one or more of the nodes 302a, 302b, 302c, 302d of the network.

In an aspect, the user device 303 can be associated with a first identifier 305, such as a user identifier or device identifier. As an example, the first identifier 305 can be any identifier, token, character, string, or the like, for differentiating one user or user device (e.g., user device 303) from another user or user device. In a further aspect, the first identifier 305 can identify a user or user device as belonging to a particular class of users or user devices. As a further example, the first identifier 305 can comprise information relating to the user device, such as a manufacturer, a model or type of device, a service provider associated with the user device 303, a state of the user device 303, a locator, and/or a label or classifier. Other information can be represented by the first identifier 305. In an aspect, the first identifier 305 can be an internet protocol address, a MAC address, a network address, an Internet address, or the like. As an example, the first identifier 305 can be relied upon to establish a communication session between the user device 303 and the computing device 304 or other devices (e.g., nodes 302a, 302b, 302c, 302d) and/or networks. As a further example, the first identifier 305 can be used as an identifier or locator of the user device 303. In an aspect, the first identifier 305 can be persistent for a particular network and/or location.

In an aspect, one or more of the nodes 302a, 302b, 302c, 302d can be configured to communicate with another of the nodes 302a, 302b, 302c, 302d and/or the gateway 304 via one or more communication paths. In an aspect, the one or more communication paths can comprise one or more uninterrupted communication links, sequential links, pre-defined paths or links, and/or intervening nodes. Links can comprise a single point to point connection between two devices or network devices. Paths can comprise one or more links. As an example, one or more of the communication paths can comprise one or more of the nodes 302a, 302b, 302c, 302d. As a further example, one or more of the nodes 302a, 302b, 302c, 302d can be configured as a mesh network. In an aspect, one ore more of the communication paths can be configured to transmit one or more services.

In an aspect, the nodes 302a, 302b, 302c, 302d can be configured as a network, such as a mesh network. As an example, the gateway 304 and/or one or more nodes 302a, 302b, 302c, 302d can comprise a dual band wireless network device. As an example, a first service 307a or network can be provided. The first service 307a can be configured with a first service set identifier (SSID) (e.g., associated with a user network or private network) to function as a local network for a particular user or users. As a further example, a second service 307b or network can be provided. The second service 307b can be configured with a second service set identifier (SSID) (e.g., associated with a public/community network or a hidden network) to function as a secondary network or redundant network for connected communication devices.

In an aspect, one or more of the nodes 302a, 302b, 302c, 302d can comprise an identifier 308a, 308b, 308c, 308d. As an example, one or more identifiers can be a media access control address (MAC address). Any uniquely identifiable attribute that can be linked to a location can be used as the identifier 308a, 308b, 308c, 308d. Such attributes can comprise one or more of an IP Address, serial number, latitude/longitude, geo-encoding, custom assigned unique identifier, global unique identifier (GUID), and the like. As a further example, one or more identifiers 308a, 308b, 308c, 308d can be a unique identifier for facilitating communications on the physical network segment. In an aspect, each of the nodes 302a, 302b, 302c, 302d can comprise a distinct identifier 308a, 308b, 308c, 308d. As an example, the identifiers 308a, 308b, 308c, 308d can be associated with a physical location of the nodes 302a, 302b, 302c, 302d.

In an aspect, one or more nodes 302a, 302b, 302c, 302d can be in communication with the gateway 304a. As an example, one or more nodes 302a, 302b, 302c, 302d and/or the gateway 304a can be configured to allow one or more wireless devices to connect to a wired and/or wireless network using Wi-Fi, Bluetooth or similar standard. The gateway 304a can comprise an identifier 309a. As an example, one or more identifiers 309a can be a media access control address (MAC address). As a further example, one or more identifiers 309a can be a unique identifier for facilitating communications on the physical network segment.

In an aspect, a computing device 310 can be in communication with a network device, such as gateway 304a. As an example, the computing device 310 can be or comprise an application server, management device, auto-configuration server (ACS), AAA server, etc. In another aspect, the computing device 310 is located within a network, such as a wide area network (WAN).

In an aspect, the user device 303 can connect to a first network via a network device, such as node 302b. As an example, the user device 303 can discover one or more beacons 312a, 312b transmitted (e.g., wirelessly) by the node 302b. The one or more beacons 312a, 312b can comprise a beacon frame. The one or more beacons 312a, 312b can comprise information to facilitate a connection between the user device 303 and the network device 116. The one or more beacons 312a, 312b can comprise or relate to one or more SSIDs. As an example, a first beacon 312a can be associated with a first SSID and/or a first service (e.g., first service 307a). As another example, a second beacon 312b can be associated with a second SSID and/or a second service (e.g., second service 307b).

In an aspect, the one or more beacons 312a, 312b and/or an SSID can be transmitted over one or more channels or frequency bands. The user device 303 can be configured to support 2.4 GHZ and 5 GHZ bands for WiFi. Within the 2.4 Ghz band, multiple channels (e.g., channels 1-11 (in the United States) and 1-14 (outside the United States) can be used. The 2.4 GHz band can comprise 2412 Mhz-2484 Mhz. The 5 Ghz band can comprise one or more channels governed by many possible regulations between channel 7 and 196, for example, between 4915 Mhz and 5825 Mhz. Any number of channels where regulations allow can be used to broadcast a beacon (e.g., one or more beacons 312a, 312b) and transmit data. In another aspect, the methods and systems described herein can use an RF scan to determine a number of service set identifiers (SSID) that are being transmitted on one or more RF channels. An RF scan can be implemented via a receiver of an access point (or other configured device), whereby the receiver analyzes one or more signals currently present on a given channel(s) for which the scan is occurring. The access point can demodulate any signals, which can be demodulated, and interpret the content of the demodulated signal. The access point can determine saturation of the given channel. Saturation can comprise the availability of transmit time slots on the given channel. The access point can determine the level of noise on the channel (e.g., for a signal that cannot be demodulated). The access point can determine a list of other devices which are transmitting on the given channel, as well as the noise floor. Such a list of devices can include other access points, WiFi clients, or transmitting devices. The RF scan can be performed on one or multiple channels. As an example, the RF scan can determine the number of APs that are sending a beacon for a particular SSID. As another example, the RF scan can be used to determine a noise floor, a number of SSIDs with the same name, one or more SSIDs or devices with a signal received above a configurable threshold. The RF scan can also determine a received signal strength indicator (RSSI) associated with one or more of the SSIDs. A determination can be made to select one of a plurality of RF channels to transmit one or more SSIDs. As an example, an AP can be configured (e.g., automatically self-configured) to transmit an SSID on the select RF channel.

Figure 4:
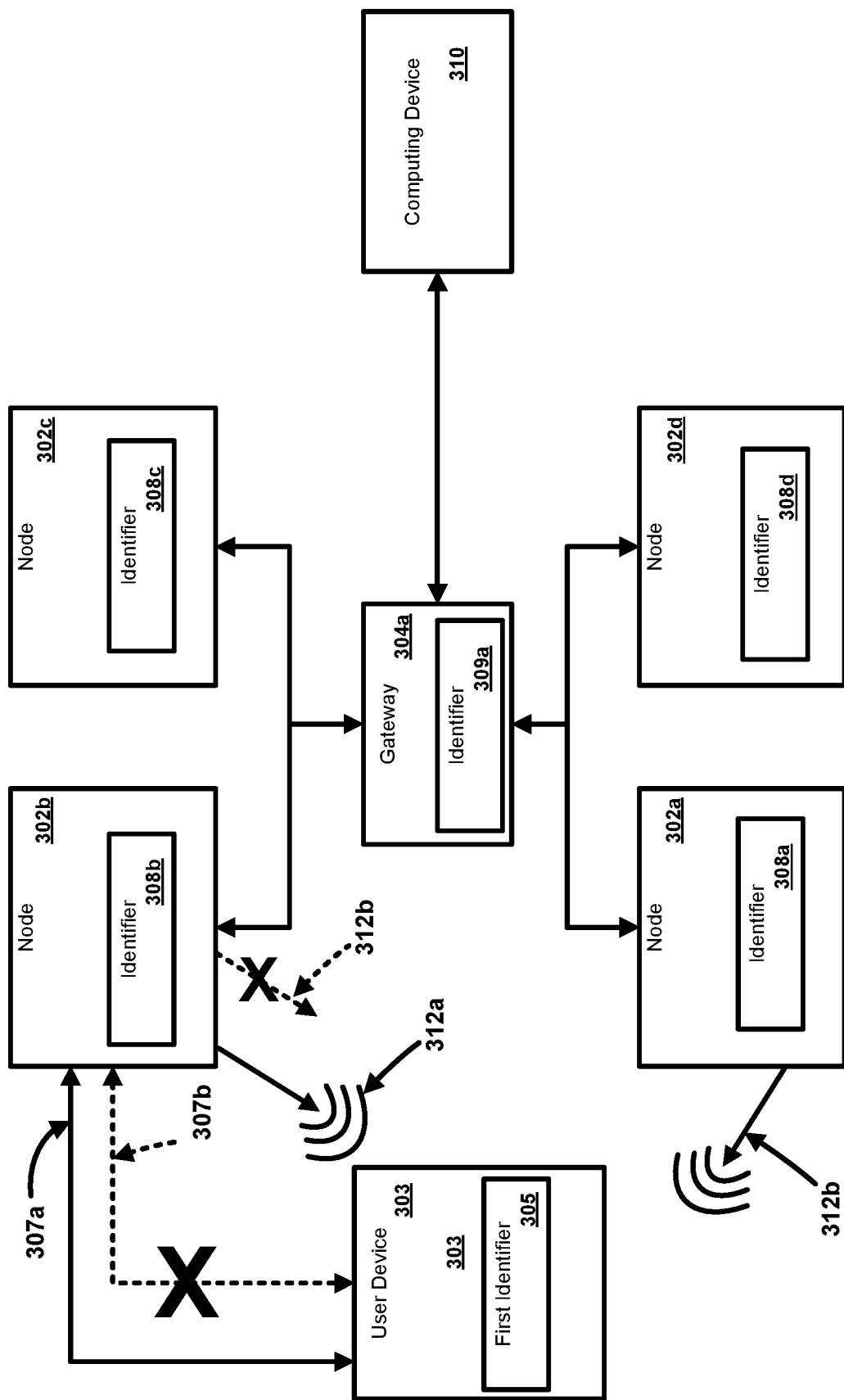
FIG. 4 is a block diagram of an exemplary system and network.

The one or more nodes 302a, 302b, 302c, 302d and/or the gateway 304 can inhibit the user device 303 from accessing one or more services provided via the network device. For example, the one or more nodes 302a, 302b, 302c, 302d and/or the gateway 304 may disable access to one or more signals associated with a particular SSID (e.g., service 307b), as illustrated in FIG. 4. As an example, the second beacon 312b can be suppressed (e.g., disabled, not transmitted, decreased in the signal strength and/or power, changed in the directionality and/or frequency of the signal) at least by the node 302b, which may not allow the user device 303 to discover the SSID associated with the second service 307b. However, other nodes 302a, 302c, 302d may provide the second beacon 312b as an alternative to the suppressed second beacon 312b from node 302b if interference conditions allow such second beacon 312b to be transmitted elsewhere. As another example, the one or more nodes 302a, 302b, 302c, 302d and/or the gateway 304 can allow access to a home SSID, but block access to other SSID's transmitted via the one or more nodes 302a, 302b, 302c, 302d and/or the gateway 304. Such operation can ensure that the user device 303 is receiving the service that it had subscribed to and that traffic is segregated accordingly for optimal service. Such operation can be repeated for one or more devices associated with the one or more nodes 302a, 302b, 302c, 302d and/or the gateway 304. When the user device 303 connects to a network device that does not have the filter information (e.g., template) the user device can access the service. As an example, inside a user premises where noise is detected, the user device 303 may be blocked from accessing a public Wi-Fi network, while outside the premises where a particular channel has a signal above a configured threshold, the user device 303 can be permitted to access the public Wi-Fi network. As another example, if a scan determines that the noise is at a level where the one or more nodes 302a, 302b, 302c, 302d is not capable of providing useable service the one or more nodes 302a, 302b, 302c, 302d may not broadcast a particular SSID. As a further example if an RF scan determines that there are already 3 devices (e.g., nodes 302a, 302b, 302c, 302d) broadcasting a given SSID received at a level of −50 dbm or higher, adding an additional broadcast of the same SSID may not add benefit to the service at that location and may hinder the service at locations near the edge of the transmit range by adding noise for the WiFi system as a whole.

Figure 5:
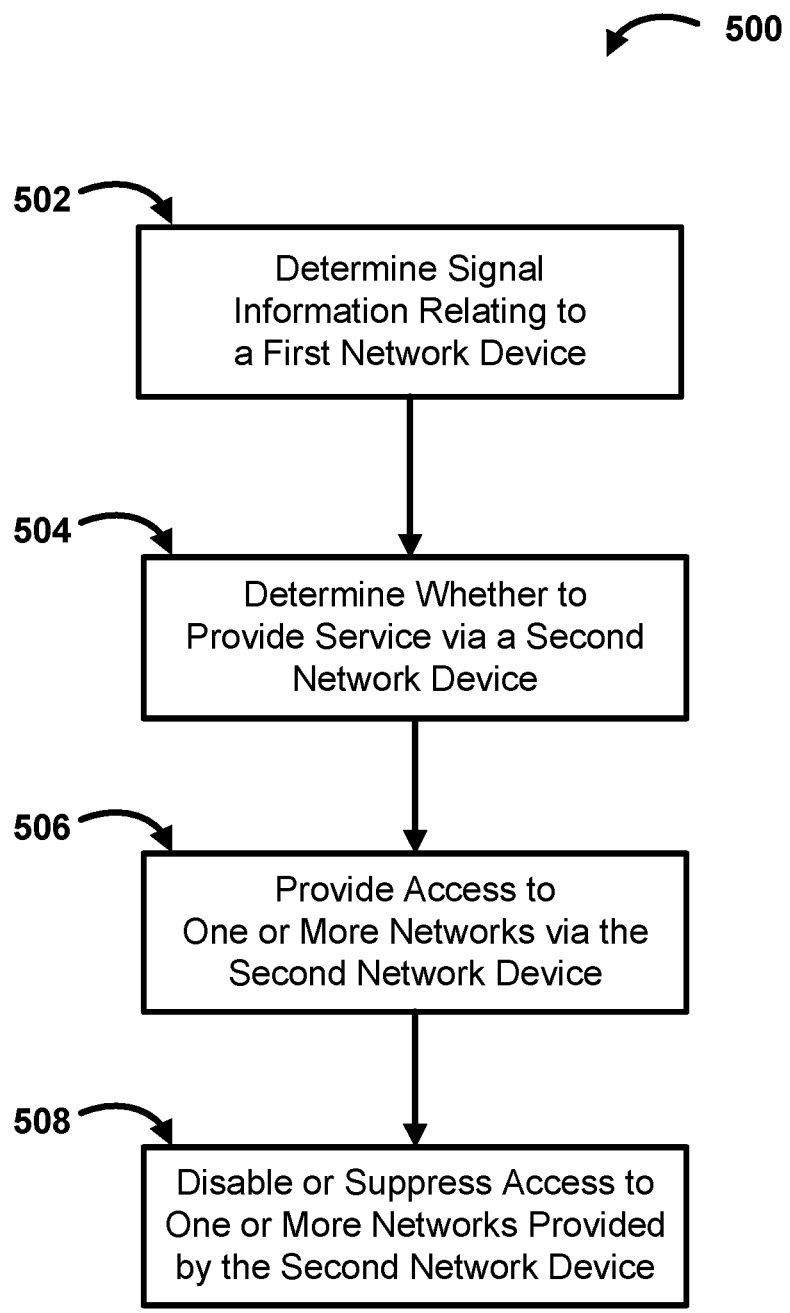
FIG. 5 is a flow chart of an exemplary method.
Figure 6:
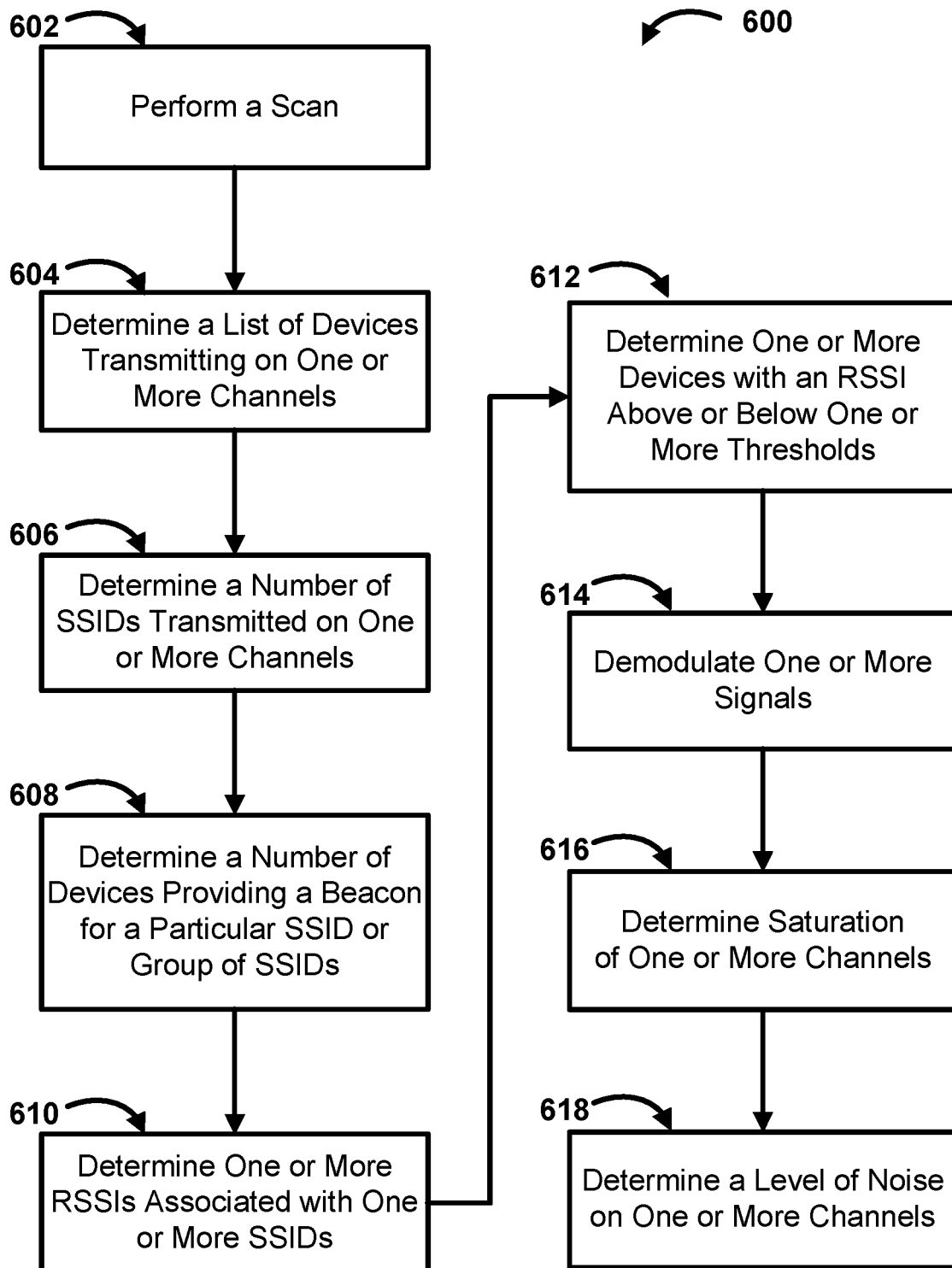
FIG. 6 is a flow chart of another exemplary method.

An exemplary method 500 is shown in FIG. 5. At step 502, signal information can be determined. The signal information can relate to an environment (e.g., user premises, broadcast area, physical environment). The environment can comprise one or more networks, for example, a first network, a second network, a third network, and the like. The signal information can relate to a first network device, a second network device, a third network device, and the like. The network devices can be wireless access points. The signal information can be determined by one or more of the network devices, such as the first devices, second device, third network device, and/or the like. For example, signal information determined at one or more of the network devices can be provided and/or transmitted to other network devices. As another example, signal information can be determined by each of the network devices independently. In an aspect, the signal information can relate to channel information, signal strength, signal identifiers, noise, or a combination thereof. In an aspect, the signal information can be determined as illustrated in FIG. 6, and described below.

The signal information can relate to multiple network devices, such as a first network device, a second network device, a third network device, and the like. The network devices can comprise wireless access points. At least a portion of the signal information can be associated with a first network. For example, the first network can comprise a public network (e.g., a public wireless network), wide area network, open network, provider managed network, non-user managed network, provider controlled network, non-user controlled network, and/or the like. The first network can comprise a network in which one or more of the access points use the same or a similar SSID. The first network (e.g., and/or services thereof) can be accessed by users based on credentials associated with a service provider (e.g., internet service provider, content provider). For example, a service provider can provide network devices (e.g., gateways, routers, wireless access points) to multiple users, such as a first user, a second user, a third user, and the like. The network devices can provide service (e.g., by default, or by enablement) to a public wireless network (e.g., first network), which is accessible by other users who subscribe to services of the service provider. For example, the first user and/or the other users can access the first network through any network device by using the users' credentials associated with the service provider.

One or more (or each) of the network devices can also provide respective second networks (e.g., local networks, private networks, first closed networks, user managed networks, user controlled networks, user deployed networks). A respective second network can comprise a wireless network having a different SSID than the first network and utilizing private credentials associated with and/or managed by a user, such as an owner or lease of one of the network devices. For example a second user can manage a second network device. For example, the second user can access and/or manage a respective second network on the second network device using his or her private credentials. Other users, such as the first user, who are in range (e.g., visitors, passersby, neighbors), such as the first user, of one of the network devices (e.g., first network device, second network device) can access the first network through the second network device and/or first network device according to the users' credentials with the service provider. As a further illustration, the first user can access a respective second network on the first network device as well as the first network on the second network device. The first user may be unable to access another respective network on the second network device without permission of the second user.

At step 504, a determination can be made whether to provide access to the first network. For example, a determination can be made as to whether to provide access to the first network on the second network device. The second user can receive (e.g., purchase, lease) the second network device from the service provider. When the second user powers on and/or restarts the second network device, the second network device can perform step 502, 504, and 506 as well as other configuration procedures. The determination of step 504, can be based on the determined signal information from step 502. Such a determination can be based, for example, on an insufficient number of other network devices providing access to the particular network, such that there is a need to provide access to the particular network in the range of the second network device. For example, all or a portion of the signal information (e.g., illustrated in FIG. 6) can be analyzed, compared to one or more thresholds, and/or the like. After such analysis and/or comparison, the determination can be made to select one of a plurality of RF channels to transmit or suppress one or more signals associated with one or more SSIDs. For example, the RF channel can be selected based on the noise floor (e.g., lowest noise), saturation (e.g., lowest saturation), number of devices (e.g., lowest number) transmitting on the channel, number of devices (e.g., lowest number) transmitting a particular or group of SSIDs, RSSI (e.g., lowest RSSI), and/or other signal information.

At one aspect, it can be determined at step 504 to suppress and/or disable access to a particular network, such as the first network. Such a determination can be based, for example, on a number of other network devices already providing access to the particular network, such that there is no need to provide access to the particular network. Moreover, it can be determined that providing access to the particular network might be detrimental to overall network performance. As an example, an access point can be configured (e.g., automatically self-configured) to transmit, suppress, and/or disable a signal (e.g., and accompanying SSID) on the select RF channel. A signal (e.g., and accompanying SSID) can be suppressed by decreasing the signal strength and/or power, changing the directionality and/or frequency of the signal, and/or the like. A signal (e.g., and accompanying SSID) can be disabled by ceasing transmission of a signal for the particular network, determining not to provide the signal (e.g., during an initialization sequence), and/or the like.

At step 506, an access mechanism can be provided to facilitate access to the first network and/or a respective second network via the second network device. For example, the access mechanism can be provided based on the determination of whether to provide access to the first network. The access mechanism can comprise a signal, beacon, and/or an SSID. Access to the first network can be conditioned upon verification of user credentials associated with a service provider. Access can be provided to one or more of the first network and a respective second network via the second network device. As an example, the first network device and the second network device can be configured to provide access to the first network based on a first network identifier (e.g., SSID). The second network device can be configured to provide access to a first of the respective second networks based on a second network identifier (e.g., identifier defined by and/or associated with second user). The first network device can be configured to provide access to a second of the respective second networks based on a third network identifier (e.g., identifier defined by and/or associated with first user).

At step 508, access to the one or more networks can be suppressed and/or disabled. For example, the access mechanism can be configured to suppress and/or disable the first network and/or second network. The access mechanism can disable (e.g., during operation or an operation interruption) one or more signals (e.g., and discontinue use of the accompanying SSID) configured to provide access to the first network and/or second network. During an initialization sequence (e.g., after powering on or restarting a network device), an option to disable and/or suppress can be selected thereby modifying or determining operation of the access mechanism.

In one aspect, the method 500 can be performed iteratively by a device, such as the second network device. For example, the second network device can perform the method 500 after a triggering event, such as the passage of a time period, performance of an initialization sequence, and/or the like. After the triggering event occurs, the method 500 can return to step 502 and perform some or all of the steps of the method 500 again.

Another exemplary method 600 is shown in FIG. 6. The method 600 can be used for determining (e.g., receiving, accessing, detecting) signal information. It should be noted that the signal information can be determined by performing one or more the steps of FIG. 6. For example, the method 600 can implement step 502 of the method 500 of FIG. 5, step 702 of the method 700 of FIG. 7, and step 804 of the method 800 of FIG. 8. At step 602, a scan can be performed. The scan can be performed via a receiver of an access point (or other configured device), whereby the receiver analyzes one or more signals currently present on one or more channels for which the scan is occurring.

At step 604, a list of devices which are transmitting on one or more channels can be determined (e.g., based on the scan). For example, a service provider can maintain the list as network devices associated with the service provider are deployed in a network environment. As another example, a network device can listen to signal and collect information associated with the signals. The network device can determine the devices by information in the signals, by communicating directly with the network devices (e.g., requesting information), by collecting network information and associating the network information with a device profile, and/or the like. The list of devices can include access points, WiFi clients, transmitting devices, and/or the like.

At step 606, a number of service set identifiers (SSID) that are being transmitted on one or more channels can be determined (e.g., based on the scan and/or list of devices). For example, the SSIDs can be transmitted by the devices from the list of devices. As an illustration, a network device broadcasting a signal can provide an SSID as part of the signal. Network devices tuned to the one or more channels can receive signals and determine the SSIDs from received signals. A device listening for all signals on a channel can collect and number the SSIDs as the signals are received.

At step 608, a number of devices providing a beacon for a particular SSID or group of SSIDs can be determined (e.g., based on the scan and/or list of devices). For example, one or more devices can be configured to provide a wireless network with the same or similar SSID. As another example, the particular SSID or group of SSIDs can be associated with a service provider. A device listening for all signals with a particular SSID or group of SSIDs can collect and number the SSIDs as the signals are received.

At step 610, a received signal strength indicator (RSSI) associated with one or more of the SSIDs can be determined. For example, the RSSI can indicate an amount of power present in a signal. The RSSI can be indicative of a distance from a device providing an SSID. A network device listening for signals can receive the signals as the signals arrive. The network device can measure the received signal strength by digital and/or analog signal processing applied to the signal.

At step 612, one or more devices with a received signal strength (e.g., RSSI) above or below one or more thresholds can be determined. For example, one or more thresholds can be stored and compared to the received signal strength. The one or more thresholds can be determined based on the features and/or characteristics of the environment and/or otherwise determined using techniques known to those of ordinary skill in the art. In one aspect, the one or more thresholds can be related to ensuring consistent access to a specific network by multiple devices, preventing duplication of service, preventing disruptive levels of interference and/or the like. The one or more thresholds can vary over time based on number of overall devices and other environmental factors.

At step 614, one or more signals (e.g., detected can by the scan) can be demodulated. The demodulated signal can be interpreted and analyzed for relevant information. For example, the signal can comprise user information (e.g., subscription information), content information (e.g., content resolution), network information (e.g., bit rate), device information (e.g., device memory levels, processor usage, signal power), and/or other information. The information can be used to determine acceptable amounts of noise, service duplication, service quality, future bandwidth and/or signal needs, and/or to like. Such information can be used in determining whether to enable and/or disable a network signal at a device.

At step 616, saturation of one or more channels can be determined (e.g., based on the scan). Saturation can comprise the availability of transmit time slots on the given channel. During the scan, the receiver can be configured to request and/or listen for time slot information provided by one or more devices relevant to one or more channels. The saturation information can be indicative of overcrowding, duplication, and/or the like of signals in the network environment. For example, the saturation levels can be compared to certain thresholds in determining whether to enable and/or disable a network signal at a device.

At step 618, the level of noise on one or more channels (e.g., for a signal that cannot be demodulated) can be determined (e.g., based on the scan). For example, a noise floor can be determined for one or more channels. For example, noise from a variety of sources that interrupts a particular signal can be received and summed together to determine the noise floor. A variety of other noise information can be determined including but not limited to length of noise, strength of noise, amount of disruption to a signal caused by the noise, and/or the like. For example, the level of noise, noise floor, length of noise, strength of noise, disruption cause by noise, and/or the like can be indicative of overcrowding, duplication, and/or the like of signals in the network environment. Such noise information can be compared to certain thresholds in determining whether to enable and/or disable a network signal at a device.

Figure 7:
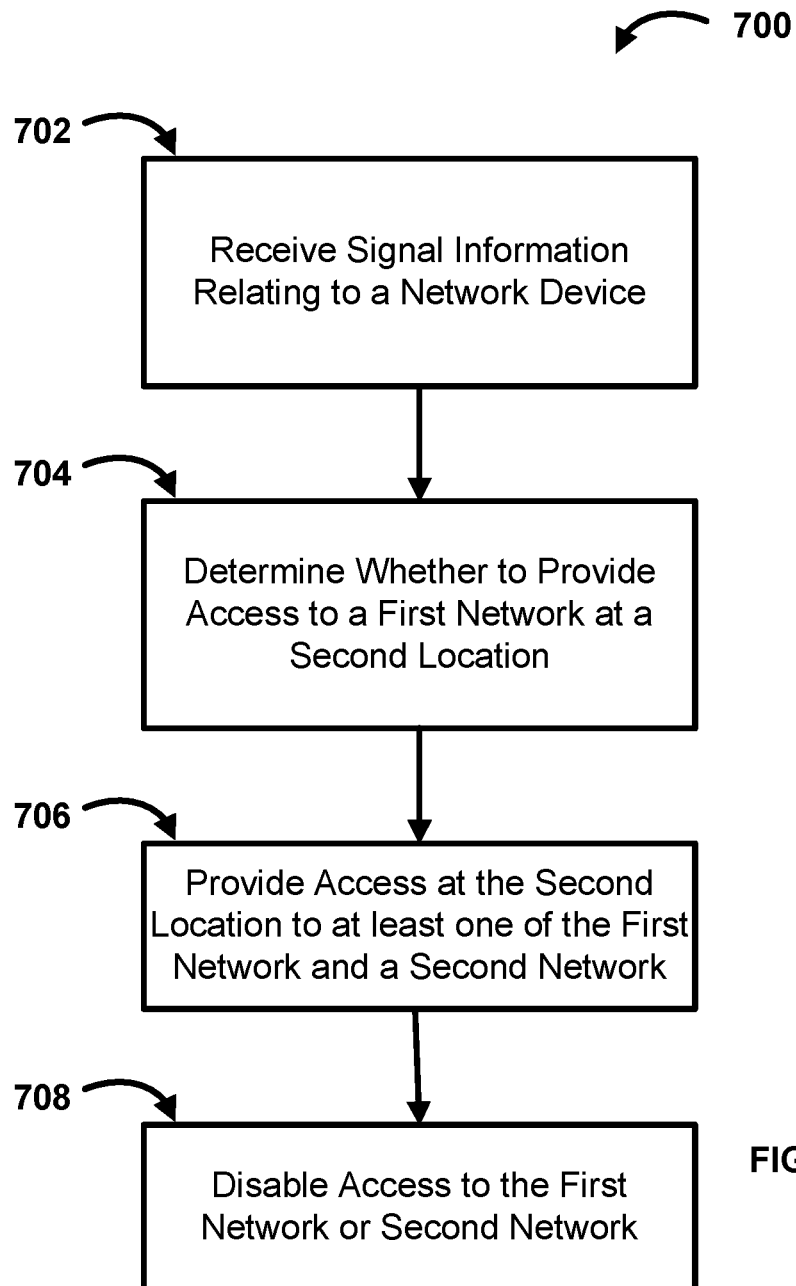
FIG. 7 is a flow chart of another exemplary method.

Another exemplary method 700 is shown in FIG. 7. At step 702, signal information can be received. The signal information be received from and/or relate to one or more remote devices. For example, one or more (e.g., or each of a plurality of) network devices can determine signal information as illustrated by the method 600 of FIG. 6. The at least one network device can provide the signal information to a first network device. The first network device can be a central management device and/or a node in a local, regional, and/or wide area network in which the network devices are distributed. Whether acting as a node or a central management device, the first network device can also be configured to independently determine at least a portion of the signal information as illustrated in FIG. 6. The signal information can relate to at least one network device providing access to a first network from at least one respective first location. A location can comprise a geospatial area, network address (e.g., internet protocol address, media access control address), a group of network addresses (e.g., defined by a subnet mask or prefix), customer premises (e.g., apartment, home, office, property, vehicle), and/or the like. A location can be fixed or mobile, such as location associated with a mobile device and/or vehicle. In an aspect, the signal information can relate to channel information, signal strength, signal identifiers, noise, or a combination thereof.

At step 704, a determination can be made whether to provide access to the first network at a second location. Such a determination can be based, for example, on an insufficient number of other network devices providing access to the particular network, such that there is a need to provide access to the particular network in the range of the second network device. For example, the second location can be located distant (e.g., outside the range of a wireless network) or proximate (e.g., within range of a wireless network, close enough to cause noise, interference, disruption, or duplication of a wireless service) to the first location. By way of illustration, the first location can be a first hotel unit, apartment, condo, townhome, business premises, unit, store, service center, and/or the like of a building and/or building complex. The second location can be a second hotel unit, apartment, condo, townhome, business premises, unit, store, service center, and/or the like of the same building and/or building complex. If the second location and first location are proximate to each other, network devices at these locations may duplicate services and/or interfere with services provided at the other location. For example, one or more of the network devices can provide access to the first network and identify the first network with same or similar identifier, thereby providing access to the first network at a variety of distant and/or proximate locations.

In one aspect, the first location can be a location determined by a first user (e.g., subscriber). The second location can be a location determined by a second user. For example, the network devices (e.g., first network device, second network device) can be provided (e.g., as a purchase, lease, or the like) to the first user and second user respectively by the service provider. The first user and second user can deploy the users' respective network devices at respective locations according to the users' desires. Since the service provider does not control the exact location of deployment, users, such as neighbors, may both deploy the users' network devices in proximate locations resulting in interference and/or duplication of services. For example, the service provider may desire to provide public, open, and/or provider managed services on network devices distributed to one or more private users.

In an aspect, the first network can comprise a public network (e.g., a public wireless network), wide area network, open network, provider managed network, non-user managed network, provider controlled network, non-user controlled network, and/or the like. The first network can comprise a network in which one or more of the network devices are access points that use the same or a similar SSID. The first network (e.g., and/or services thereof) can be accessed by users based on credentials associated with a service provider (e.g., internet service provider, content provider). For example, a service provider can provide network devices (e.g., gateways, routers, wireless access points) to multiple users, such as the first user and the second user. The network devices can provide service (e.g., by default, or by enablement) to a wireless network (e.g., first network or branch thereof), which is accessible by other users who subscribe to services of the service provider. For example, the first user and/or the second user can access the first network by using the users' credentials associated with the service provider.

One or more (or each) of the network devices can also provide respective second networks (e.g., local networks, private networks, closed networks, user managed networks, user controlled networks, user deployed networks). A second network can comprise a private wireless network having a different SSID than the first network and utilizing private credentials associated with and/or managed by a user, such as an owner or lease of one of the network devices. For example, a second user can manage a second network device. For example, the second user can access and/or manage a respective second network using his or her private credentials. Other users, such as the first user, who are in range (e.g., visitors, passersby, neighbors) of one of the network devices (e.g., first network device, second network device) can access the first network through the second network device and/or first network device according to their credentials with the service provider. As a further illustration, the first user can access a first of the respective second networks on the first network device as well as the first network on the second network device. The first user may be unable to access a second of the respective second networks on the second network device without permission of the second user.

In an aspect, the determination of step 704 can be based on the determined signal information. For example, all or a portion of the signal information (e.g., illustrated in FIG. 6) can be analyzed, compared to one or more thresholds, and/or the like. After such analysis and/or comparison, the determination can be made to select one of a plurality of RF channels to transmit or suppress one or more signals associated with one or more SSIDs. For example, the RF channel can be selected based on the noise floor (e.g., lowest noise), saturation (e.g., lowest saturation), number of devices (e.g., lowest number) transmitting on the channel, number of devices (e.g., lowest number) transmitting a particular or group of SSIDs, RSSI (e.g., lowest RSSI), and/or other signal information.

In an aspect, determining whether to provide access to the first network at the second location can comprise determining not to provide a network signal for the first network at the second location. Such a determination can be based, for example, on a number of other network devices already providing access to the particular network, such that there is no need to provide access to the particular network. Moreover, it can be determined that providing access to the particular network might be detrimental to overall network performance.

In another aspect, determining whether to provide access to the first network at the second location can be performed by a network device at the second location during an initialization sequence of the network device at the second location. In another aspect, determining whether to provide access to the first network at the second location can be performed by a network device at another location (e.g., first location, central location). In a further aspect, determining whether to provide access to the first network at the second location can comprise determining a number of the at least one network devices providing access to the first network on a network channel. If the number is above, below, or equal to one or more thresholds, it can be determined to provide access or to disable (e.g., or determine not to provide access) access to the first network at the second location.

At step 706, access can be provided at the second location to at least one of the first network and a respective second network based upon the determination of whether to provide access to the first network. Providing access to at least one of the first network and the respective second network can comprise transmitting from the second location at least one of a network signal for the first network and a network signal for the respective second network. In an aspect, access to the first network can be conditioned upon verification of user credentials associated with a service provider. The respective second network can comprise a local network, private network, closed network, user managed network, user controlled network, first user deployed network, and/or the like.

At step 708, access to one or more networks (e.g., first network, second network, third network) can be suppressed and/or disabled at one or more locations. For example, the first network device can be configured to suppress and/or disable the first network and/or a respective second network at the first location, second location, a third location, and/or the like. The first network device can disable one or more signals (e.g., and discontinue use of the accompanying SSID) configured to provide access to the first network and/or a respective second network at the first location, second location, third location, and/or the like. For example, the first network device can provide an instruction to another network device, such as the second network device, at the first location, second location, and/or third location. As another example, during an initialization sequence (e.g., after powering on or restarting the first network device or second network device), an option to disable and/or suppress can be selected thereby modifying or determining operation of the first network device or other network devices a the first location, second location, third location, and/or the like.

As an illustration, access to the first network (e.g., wide area network, public network, open network, provider managed network, non-user managed network, provider controlled network, non-user controlled network) at the first network device can be suppressed and/or disabled while access to a first of respective second networks (e.g., respective second network associated with the first network device) can be provided (e.g., conditioned upon proper credentials). Similarly, access to the first network at the second network device can be suppressed and/or disabled while access to a second of the respective second networks (e.g., respective second network associated with the second network device) can be provided (e.g., conditioned upon proper credentials).

In one aspect, the method 700 can be performed iteratively by a device, such as the first network device and/or second network device. For example, the first network device and/or second network device can perform the method 700 after a triggering event, such as the passage of a time period, performance of an initialization sequence, and/or the like. After the triggering event occurs, the method 700 can return to step 702 and perform some or all of the steps of the method 700 again.

Figure 8:
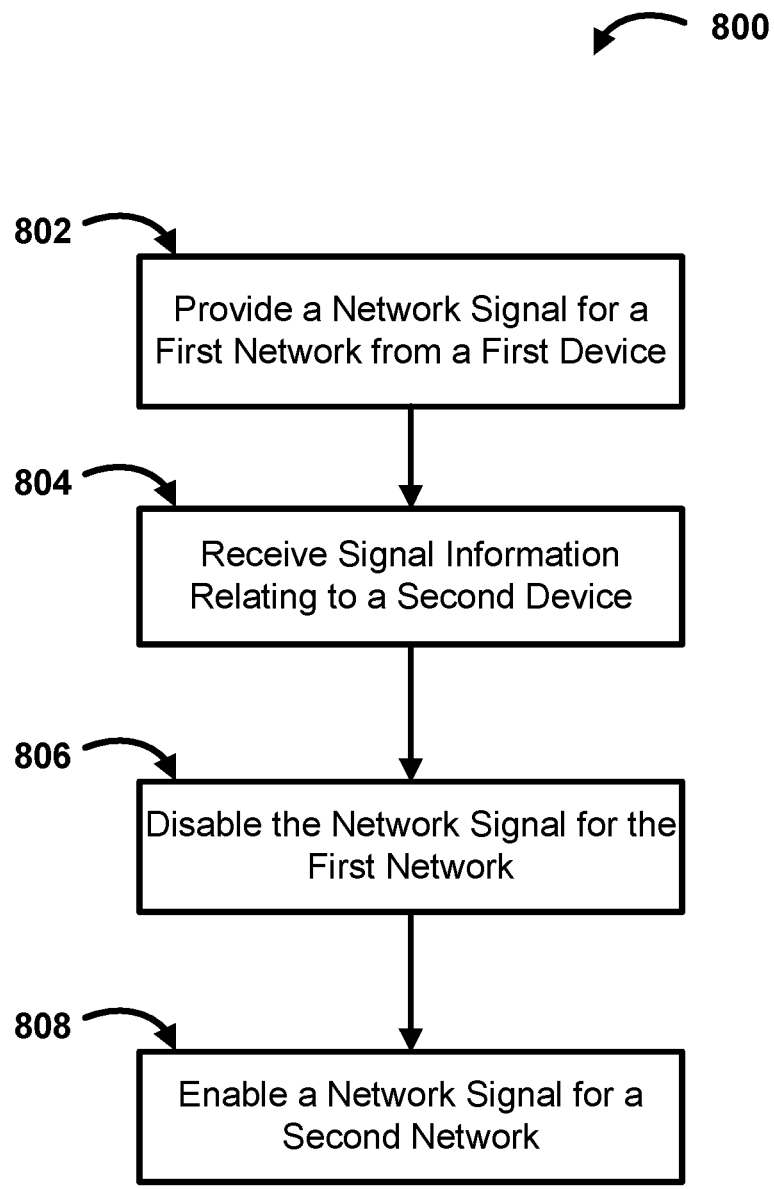
FIG. 8 is a flow chart of another exemplary method.

Another exemplary method 800 is shown in FIG. 8. At step 802, a network signal for a first network can be provided from a first device. In an aspect, the network signal can facilitate access to the first network. The first device and at least one second device can be configured to provide access to the first network based on a first network identifier. As an example, the first network identifier can comprise a wireless service set identifier (SSID). The first device and/or second device can comprise wireless access points. For example, the first network can comprise a public network, open network, wide area network, provider managed network, provider controlled network, and/or the like. The first network can comprise a network in which one or more of the access points use the same or a similar SSID. The first network (e.g., and/or services thereof) can be accessed by users based on credentials associated with a service provider (e.g., internet service provider, content provider). For example, a service provider can provide network devices (e.g., gateways, routers, wireless access points) to multiple users, such as a first user and a second user. The network devices can provide service (e.g., by default, or by enablement) to the first network, which is accessible by other users (e.g., second user) who subscribe to services of the service provider. Access to the first network can be conditioned upon verification of user credentials associated with a service provider. For example, the first user and/or the other users can access the first network through any network device by using users' credentials associated with the service provider.

One or more (or each) of the first device, second device, and other devices can also provide respective second networks, such as a local networks, private networks, closed networks, user managed networks, user controlled networks, user deployed networks, and/or the like. A respective second network can comprise a wireless network having a different SSID than the first network and utilizing private credentials associated with and/or managed by a user, such as an owner or lease of one of the network devices. For example a second user can manage a second network device. For example, the second user can access and/or manage a respective second network using his or her private credentials. Other users, such as the first user, who are in range (e.g., visitors, passersby, neighbors) of one of the devices (e.g., first device, second device) can access the first network through the second device and/or first device according to the first user's credentials with the service provider. As a further illustration, the first user can access a first of the respective second networks on the first device as well as the first network on the second device. The first user may be unable to access a second of the respective second networks on the second network device without permission of the second user.

At step 804, signal information can be received. In an aspect, the signal information can be determined as illustrated in FIG. 6. As an example, the signal information can relate to the at least one second device providing access to the first network. In another aspect, the signal information can relate to channel information, signal strength, signal identifiers, noise, or a combination thereof. As a further example, the first device can receive the signal information by performing a scan for signals on one or more wireless channels. The first device can also receive the signal information from another device, such as the second device, a central management device, and/or the like.

At step 806, the network signal for the first network can be suppressed, and/or disabled (e.g., for a particular device). For example, the network signal at the first device can be suppressed or disabled. A signal (e.g., and accompanying SSID) can be suppressed by decreasing the signal strength and/or power, changing the directionality and/or frequency of the signal, and/or the like. A signal (e.g., and accompanying SSID) can be disabled by ceasing transmission of a signal for the particular network, determining not to provide the signal, and/or the like.

In an aspect, disabling or suppressing the network signal of the first device can be based on the signal information. For example, all or a portion of the signal information (e.g., illustrated in FIG. 6) can be analyzed, compared to one or more thresholds, and/or the like. After such analysis and/or comparison, the determination can be made to select one of a plurality of RF channels to transmit, suppress, or disable one or more signals associated with one or more SSIDs. For example, a determination can be made whether at least one of a network density threshold and a network noise threshold has been reached. Disabling the network signal for the first network provided from the first device can be based on the determination of whether at least one of the network density threshold and the network noise threshold has been reached.

The network signal for the first network can continue to be provided at other devices. For example, the first device can be deployed at a first location. The second device can be deployed at a second location. The first location can be a first hotel unit, apartment, condo, townhome, business premises, unit, store, service center, and/or the like of a building and/or building complex. The second location can be a second hotel unit, apartment, condo, townhome, business premises, unit, store, service center, and/or the like of the same building and/or building complex. If the second location and first location are proximate to each other, network devices at these locations may duplicate services and/or interfere with services provided at the other location. For example, one or more of the network devices can provide access to the first network and identify the first network with same or similar identifier, thereby providing access to the first network at a variety of distant and/or proximate locations.

At step 808, a network signal for a respective second network (e.g., private wireless network) can be enabled. For example, the first device can determine to provide and/or continue providing the network signal for a respective second network to allow a user (e.g., first user) of the first device to access the respective second network (e.g., though the first device may have the signal for the first network disabled). Such a determination can be based, for example, on an insufficient number of other network devices providing access to the particular network, such that there is a need to provide access to the particular network in the range of the second network device.

Figure 9:
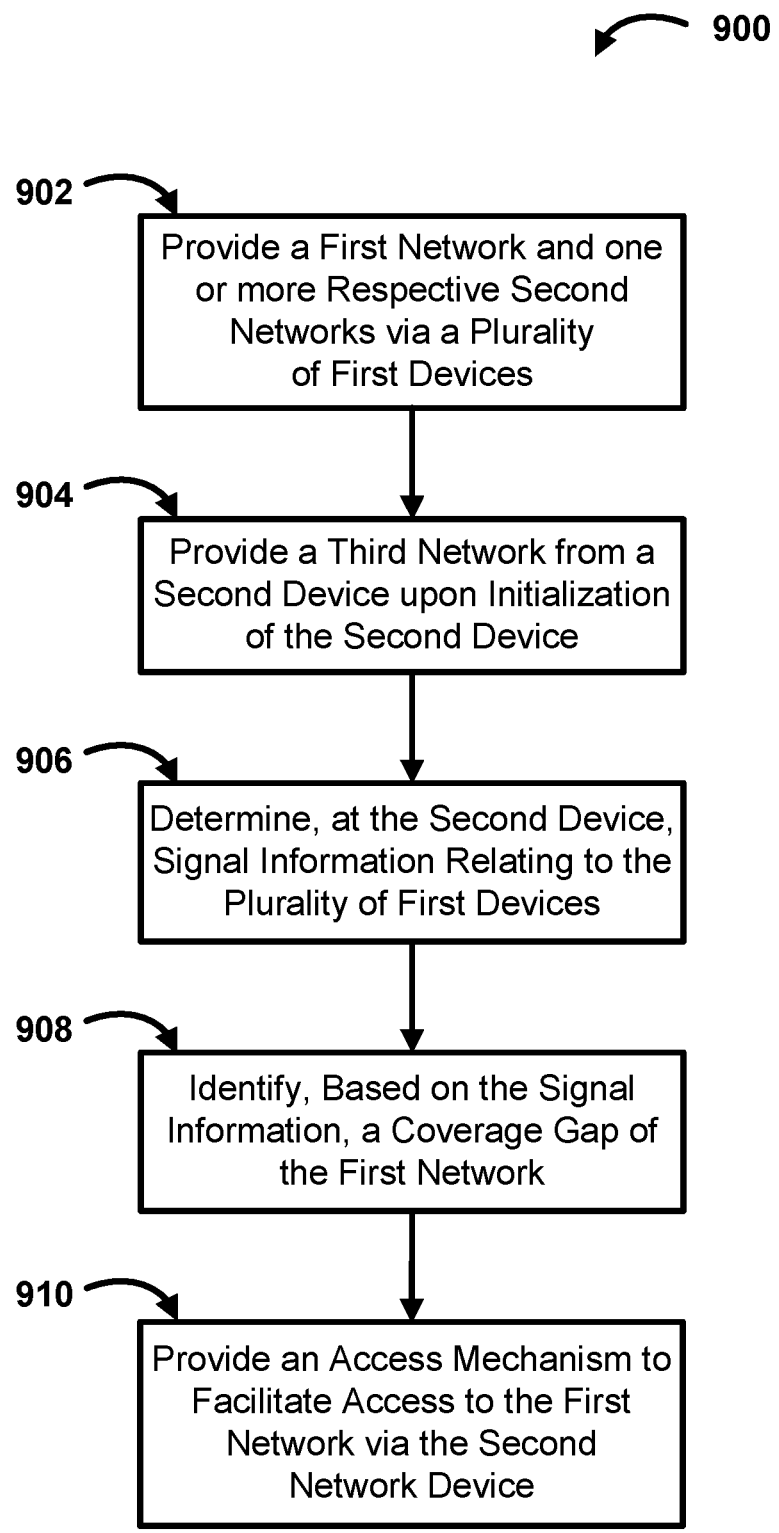
FIG. 9 is a flow chart of another exemplary method.

Another exemplary method 900 is shown in FIG. 9. At step 902, a first network (e.g., wide area network, public network, open network, provider managed network, non-user managed network, provider controlled network, non-user controlled network) can be provided via a plurality of first devices. At least a portion of the plurality of first devices can be configured to provide access to respective second networks (e.g., first local networks, first private networks, first closed networks, first user managed networks, first user controlled networks, first user deployed networks). By use of the term respective it is to be understood that one or more (e.g., each) of the plurality of first devices can provide one or more second networks. The respective second networks can be different networks from each other. For example, the respective second networks can be managed by different users, can be provided from different devices, can be accessed with different credentials, can be configured with different network settings, and/or the like. As another example, a device of the plurality of first devices can provide one or more of the respective second networks.

In one aspect, the first network can be managed by a service provider and accessible by users (e.g., customers, subscribers) of the service provider based on user credentials. The respective second networks can be networks managed by respective users of the service provider. The plurality of first devices can be configured to provide access to the first network based on a first network identifier. For example, the first network identifier can comprise an SSID, a portion of an SSID, and/or the like. Deployment locations of at least a portion of the plurality of first devices can be selected by users of a service provider. For example, the service provider can provide (e.g., sell, lease, loan) devices, such as a gateway, router (e.g., wireless router), and/or the like for users to access the Internet (or other network). A respective user can then place his or her respective device at a location in or about user's premises, such as a business location, apartment, home, and/or the like as described herein.

The service provider can provide at least one media related service to the users via the first network. For example, the service provider can provide Internet service, video service (e.g., video on demand, streaming video), audio service (e.g., audio streaming), digital video recording, gaming services, and/or the like.

At step 904, a third network (e.g., second local network, second private network, second closed network, second user managed network) can be provided from a second device. For example, the third network can be provided upon initialization of the second device, after initialization of the second device, and/or the like.

At step 906, signal information relating to the plurality of first devices can be determined, at the second device. For example, the signal information can be determined by the second device during an initialization sequence of the second device. Signal information can relate to channel information, signal strength, signal identifiers, noise, or a combination thereof.

At step 908, a coverage gap of the first network can be identified based on the signal information. For example, signal information can be analyzed based on strength, geographic location, noise, and/or other information described herein (e.g., as shown in FIG. 6.). As another example, signal information can be compared to one or more thresholds. As an illustration, if signal strength information (e.g., or other signal information) received at the second device (e.g., or other devices, such as one or more of the plurality of first device) is above, below, and/or equal to a threshold, then a coverage gap can be identified. The coverage gap can be associated with a location of a device receiving the signal information and/or the device itself. It should be noted that determining the coverage gap does not require identifying the full extent of the coverage gap but rather can be accomplished by identifying a particular location that is above or below specified thresholds indicative of coverage as described herein.

At step 910, an access mechanism can be provided to facilitate access to the first network via the second network device based on the identification of the coverage gap. The access mechanism can comprise a signal, beacon, an SSID, and/or the like. The second device can be configured to provide access to the first network based on a first network identifier.

In an aspect, the method 900 can comprise monitoring the signal information after providing the access mechanism. The signal information can be monitored from the second device, one or more of the plurality of first devices, and/or another device. The signal information can be monitored continuously, intermittently (e.g., at predefined events, such as after a specified time and/or at the occurrence of an event).

In another aspect, the method 900 can comprise disabling, suppressing, and/or otherwise modifying the access mechanism in response to monitoring the signal information. An access mechanism can be suppressed and/or modified by decreasing the signal strength and/or power of the access mechanism, changing the directionality and/or frequency of the access mechanism, and/or the like. An access mechanism can be disabled by ceasing transmission of the access mechanism, determining not to provide the access mechanism, and/or the like.

Figure 10:
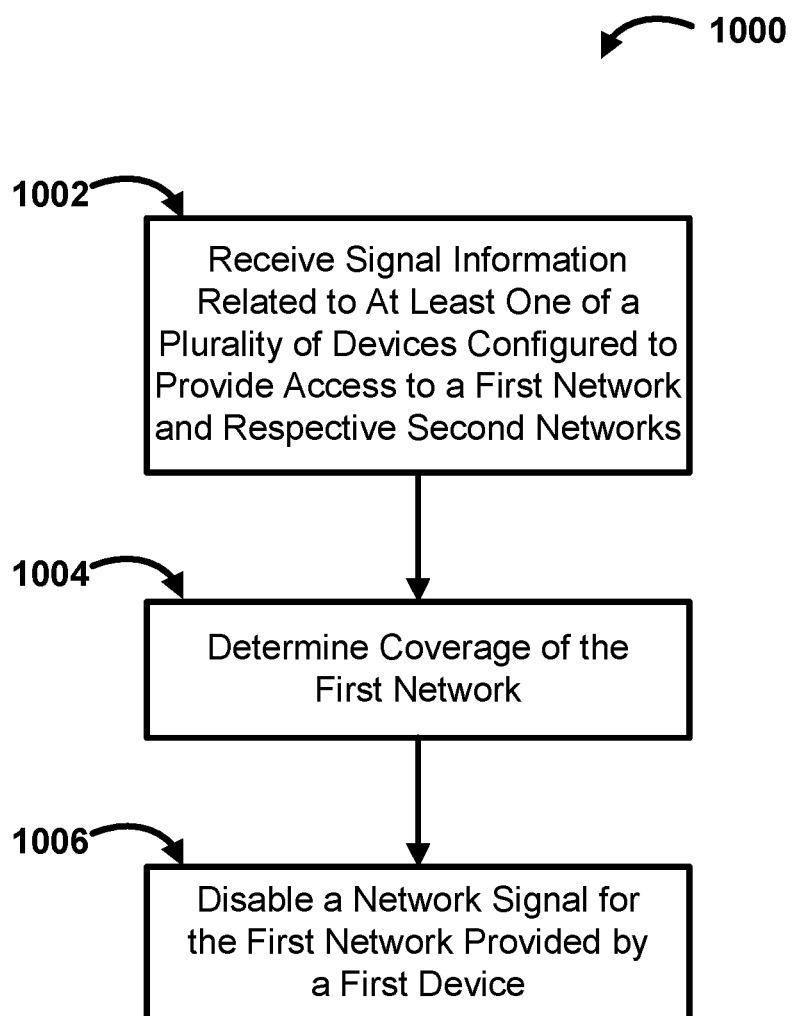
FIG. 10 is a flow chart of another exemplary method.

Another exemplary method 1000 is shown in FIG. 10. At step 1002, signal information can be received. Signal information can relate to channel information, signal strength, signal identifiers, noise, or a combination thereof. The signal information can be related to at least one of a plurality of devices configured to provide access to a first network (e.g., wide area network, public network, open network, provider network, provider managed network, non-user managed network, provider controlled network, non-user controlled network) and respective second networks (e.g., first local networks, first private networks, first closed networks, first user managed networks, first user controlled networks, first user deployed networks). For example, the signal information can be received by a first device of the plurality of devices during an initialization sequence of the first device. By use of the term respective it is to be understood that one or more (e.g., each) of the plurality of devices can provide one or more second networks. The respective second networks can be different networks from each other. For example, the respective second networks can be managed by different users, can be provided from different devices, can be accessed with different credentials, can be configured with different network settings, and/or the like. As another example, a device of the plurality of devices can provide one or more of the respective second networks.

The first network can be managed by a service provider and accessible by users (e.g., customers, subscribers) of the service provider based on user credentials. The respective second networks can be networks managed by respective users of the service provider. The plurality of devices and the first device can be configured to provide access to the first network based on a first network identifier. For example, the first network identifier can comprise an SSID, a portion of an SSID, and/or the like.

In one aspect, at least two of the plurality of devices can be located in neighboring customer premises. The plurality of devices configured to provide access to the first network and respective second networks can be deployed. For example, at least a portion of the plurality of devices can be provided to users, and deployment locations of the at least a portion of the plurality of devices can be selected by users of the service provider. By way of explanation, the service provider can provide (e.g., sell, lease, loan) devices, such as a gateway, router (e.g., wireless router), and/or the like for users to access the Internet (or other network) and/or other services. A respective user can then place his or her respective device at a location in or about user's premises, such as a business location, apartment, home, and/or the like as described herein. One or more user premises can be adjacent, proximate to, neighboring other user premises, and/or the like. One or more other user premises can be distant from (e.g., outside the range of a wireless device, separated by at least one property) other user premises.

The service provider can provide at least one media related service to the users via the first network. For example, the service provider can provide Internet service, video service (e.g., video on demand, streaming video), audio service (e.g., audio streaming), digital video recording, gaming services, and/or the like.

At step 1004, coverage of the first network can be determined. For example, coverage within range of the first device can be determined. In one aspect, it can be determined, based on the signal information, whether at least one of a network density threshold and a network noise threshold has been reached. For example, signal information can be analyzed based on strength, geographic location, noise, and/or other information described herein (e.g., as shown in FIG. 6.). As another example, signal information can be compared to one or more thresholds. As an illustration, signal strength information (e.g., or other signal information) received at the first device (e.g., or other devices, such as one or more of the plurality of devices) can be determined as above, below, and/or equal to a threshold, thereby identifying and/or classifying the coverage of the first network at one or more locations. For example, the coverage can be associated with a location of a device (e.g. first device, one or more of the plurality of devices) receiving the signal information and/or the device itself.

At step 1006, a network signal for the first network provided by the first device can be disabled, suppressed, and/or otherwise modified as described herein. The network signal can be configured to provide access to the first network when enabled. For example, the network signal can comprise a wireless signal and the first device can comprise a wireless access point. The network signal (e.g., and accompanying SSID) can be suppressed and/or modified by decreasing the signal strength and/or power of the network signal, changing the directionality and/or frequency of the signal, and/or the like. The network signal (e.g., and accompanying SSID) can be disabled by ceasing transmission of the network signal, determining not to provide the network signal, and/or the like.

In one aspect, the first device can enable a second network signal. The second network signal can comprise a network signal for a third network (e.g., second local network, second private network, second closed network, second user managed network, second user controlled network, second user deployed network).

In one aspect, the method 1000 can comprise determining, based on the signal information, whether at least one of a network density threshold and a network noise threshold has been reached. Disabling, suppressing, and/or modifying the network signal for the first network provided from the first device can be based on the determination of whether at least one of the network density threshold and the network noise threshold has been reached.

In one aspect, the method 1000 can comprise monitoring the signal information after disabling access at the first device to the first network. The signal information can be monitored from the first device, one or more of the plurality of devices, and/or another device. The signal information can be monitored continuously, intermittently (e.g., at predefined events, such as after a specified time and/or at the occurrence of an event).

In another aspect, the method 1000 can comprise enabling the disabled network signal thereby providing access to the first network via the first device in response to monitoring the signal information. Enabling the disabled network signal can comprise turning on the network signal, providing the network signal, and/or the like.

Figure 11:
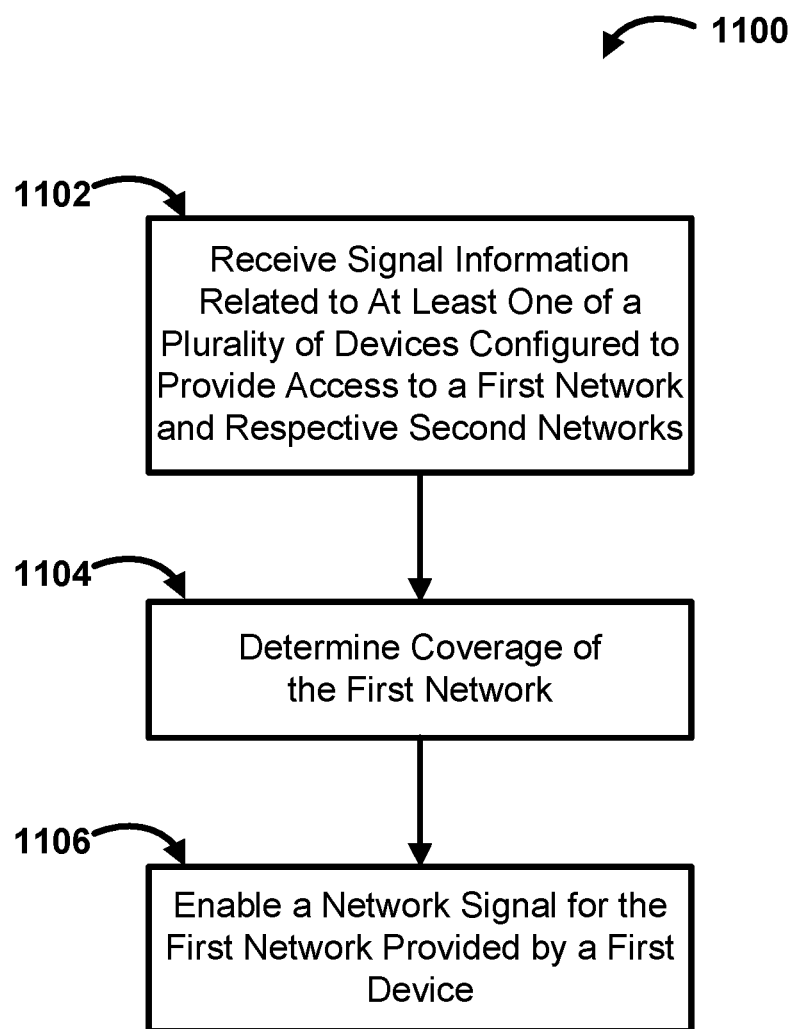
FIG. 11 is a flow chart of another exemplary method.

Another exemplary method 1100 is shown in FIG. 11. At step 1102, signal information can be received. Signal information can relate to channel information, signal strength, signal identifiers, noise, or a combination thereof. The signal information can relate to at least one of a plurality of devices configured to provide access to a first network (e.g., wide area network, public network, open network, provider network, provider managed network, non-user managed network, provider controlled network, non-user controlled network) and respective second networks (e.g., first local networks, first private networks, first closed networks, first user managed networks, first user controlled networks, first user deployed networks). For example, the signal information can be determined by the second device during an initialization sequence of the second device. By use of the term respective it is to be understood that one or more (e.g., each) of the plurality of devices can provide one or more second networks. The respective second networks can be different networks from each other. For example, the respective second networks can be managed by different users, can be provided from different devices, can be accessed with different credentials, can be configured with different network settings, and/or the like. As another example, a device of the plurality of devices can provide one or more of the respective second networks.

The first network can be managed by a service provider and accessible by users of the service provider based on user credentials. The respective second networks can be networks managed by respective users of the service provider. The plurality of devices and the first device can be configured to provide access to the first network based on a first network identifier. For example, the first network identifier can comprise an SSID, a portion of an SSID, and/or the like.

In one aspect, at least two of the plurality of devices can be located in neighboring customer premises. For example, deployment locations of at least a portion of the plurality of devices can be selected by users of a service provider. By way of explanation, the service provider can provide (e.g., sell, lease, loan) devices, such as a gateway, router (e.g., wireless router), and/or the like for users to access the Internet (e.g., or other network) and/or other services. A respective user can then place his or her respective device at a location in or about user's premises, such as a business location, apartment, home, and/or the like as described herein. One or more user premises can be adjacent, proximate to, neighboring other user premises. One or more other user premises can be distant (e.g., outside the range of a wireless device, separated by at least one property) from other user premises.

The service provider can provide at least one media related service to the users via the first network. For example, the service provider can provide (e.g., sell, lease, loan) devices, such as a gateway, router (e.g., wireless router), and/or the like for users to access the Internet (or other network). A respective user can then place his or her respective device at a location in or about user's premises, such as a business location, apartment, home, and/or the like as described herein.

At step 1104, coverage of the first network can be determined. For example, coverage within range of the first device can be determined. In an aspect, it can be determined, based on the signal information, whether at least one of a network density threshold and a network noise threshold has been reached. As an illustration, signal strength information (e.g., or other signal information) received at the first device (e.g., or other devices, such as one or more of the plurality of devices) can be determined as above, below, and/or equal to a threshold, thereby identifying and/or classifying the coverage of the first network at one or more locations. For example, the coverage can be associated with a location of a device (e.g. first device, one or more of the plurality of devices) receiving the signal information and/or the device itself.

At step 1106, a network signal for the first network can be enabled. The network signal can be configured to provide access to the first network from the first device. For example, the network signal can comprise a wireless signal and the first device can comprise a wireless access point. In one aspect, the first device can enable a second network signal. The second network signal can comprise a network signal for a third network (e.g., second local network, second private network, second closed network, second user managed network, second user controlled network, second user deployed network).

In an aspect, the method 1100 can comprise monitoring the signal information after enabling the network signal. The signal information can be monitored from the first device, one or more of the plurality of devices, and/or another device. The signal information can be monitored continuously, intermittently (e.g., at predefined events, such as after a specified time and/or at the occurrence of an event).

In an aspect, the method 1100 can comprise disabling, suppressing, and/or otherwise modifying the network signal in response to monitoring the signal information. The network signal (e.g., and accompanying SSID) can be suppressed and/or modified by decreasing the signal strength and/or power of the network signal, changing the directionality and/or frequency of the signal, and/or the like. The network signal (e.g., and accompanying SSID) can be disabled by ceasing transmission of the network signal, determining not to provide the network signal, and/or the like.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
  determining, based on wireless signal information for a wide area network, a portion of the wide area network within range of a first device of a plurality of devices, wherein the wireless signal information is received from at least one device of the plurality of devices; and
  causing, based on a threshold quantity of service set identifiers being broadcast within the portion of the wide area network within range of the first device, a network signal output by the first device to be modified, wherein the network signal is configured to facilitate access to the wide area network.

2. The method of claim 1, wherein the wireless signal information is associated with at least one of: channel information, a signal strength, a signal identifier, or signal noise.

3. The method of claim 1, wherein the wide area network is associated with the service set identifiers being broadcast within the portion of the wide area network within range of the first device.

4. The method of claim 1, wherein causing the network signal to be modified comprises at least one of:
  increasing or decreasing a signal strength of the network signal;
  increasing or decreasing a power of the network signal;
  adjusting a directionality of the network signal; or
  adjusting a frequency of the network signal.

5. The method of claim 1, wherein the plurality of devices are configured to provide access to the wide area network based on a first service set identifier output by the plurality of devices.

6. The method of claim 1, wherein the first device is configured to output the network signal via at least one of a first channel or a first frequency band, and wherein causing the network signal to be modified comprises causing the first device to output the network signal via at least one of a second channel or a second frequency band.

7. The method claim 6, wherein the threshold quantity of service set identifiers are broadcast via at least one of the first channel or the first frequency band.

8. An apparatus comprising:
  one or more processors; and
  memory storing processor-executable instructions that, when executed by the one or more processors, cause the apparatus to:
    determine, based on wireless signal information for a wide area network, a portion of the wide area network within range of a first device of a plurality of devices, wherein the wireless signal information is received from at least one device of the plurality of devices; and
    cause, based on a threshold quantity of service set identifiers being broadcast within the portion of the wide area network within range of the first device, a network signal output by the first device to be modified, wherein the network signal is configured to facilitate access to the wide area network.

9. The apparatus of claim 8, wherein the wireless signal information is associated with at least one of: channel information, a signal strength, a signal identifier, or signal noise.

10. The apparatus of claim 8, wherein the wide area network is associated with the service set identifiers being broadcast within the portion of the wide area network within range of the first device.

11. The apparatus of claim 8, wherein the processor-executable instructions that cause the apparatus to cause the network signal to be modified further cause the apparatus to at least one of:
  increase or decrease a signal strength of the network signal;

increase or decrease a power of the network signal;
adjust a directionality of the network signal; or
adjust a frequency of the network signal.

12. The apparatus of claim 8, wherein the plurality of devices are configured to provide access to the wide area network based on a first service set identifier output by the plurality of devices.

13. The apparatus of claim 8, wherein the first device is configured to output the network signal via at least one of a first channel or a first frequency band, and wherein the processor-executable instructions that cause the apparatus to cause the network signal to be modified further cause the apparatus to cause the first device to output the network signal via at least one of a second channel or a second frequency band.

14. The apparatus of claim 13, wherein the threshold quantity of service set identifiers are broadcast via at least one of the first channel or the first frequency band.

15. One or more non-transitory computer-readable storage media storing processor-executable instructions that, when executed by at least one processor, cause the at least one processor to:
determine, based on wireless signal information for a wide area network, a portion of the wide area network within range of a first device of a plurality of devices, wherein the wireless signal information is received from at least one device of the plurality of devices; and
cause, based on a threshold quantity of service set identifiers being broadcast within the portion of the wide area network within range of the first device, a network signal output by the first device to be modified, wherein the network signal is configured to facilitate access to the wide area network.

16. The one or more non-transitory computer-readable storage media of claim 15, wherein the wireless signal information is associated with at least one of: channel information, a signal strength, a signal identifier, or signal noise.

17. The one or more non-transitory computer-readable storage media of claim 15, wherein the wide area network is associated with the service set identifiers being broadcast within the portion of the wide area network within range of the first device.

18. The one or more non-transitory computer-readable storage media of claim 15, wherein the processor-executable instructions that cause the at least one processor to cause the network signal to be modified further cause the at least one processor to at least one of:
increase or decrease a signal strength of the network signal;
increase or decrease a power of the network signal;
adjust a directionality of the network signal; or
adjust a frequency of the network signal.

19. The one or more non-transitory computer-readable storage media of claim 15, wherein the plurality of devices are configured to provide access to the wide area network based on a first service set identifier output by the plurality of devices.

20. The one or more non-transitory computer-readable storage media of claim 15, wherein the first device is configured to output the network signal via at least one of a first channel or a first frequency band, and wherein the processor-executable instructions that cause the at least one processor to cause the network signal to be modified further cause the at least one processor to cause the first device to output the network signal via at least one of a second channel or a second frequency band, and wherein the threshold quantity of service set identifiers are broadcast via at least one of the first channel or the first frequency band.

* * * * *